Jan. 31, 1956 H. D. BRADBURY 2,733,301
SOUND RERECORDING SYSTEM
Filed Oct. 14, 1952
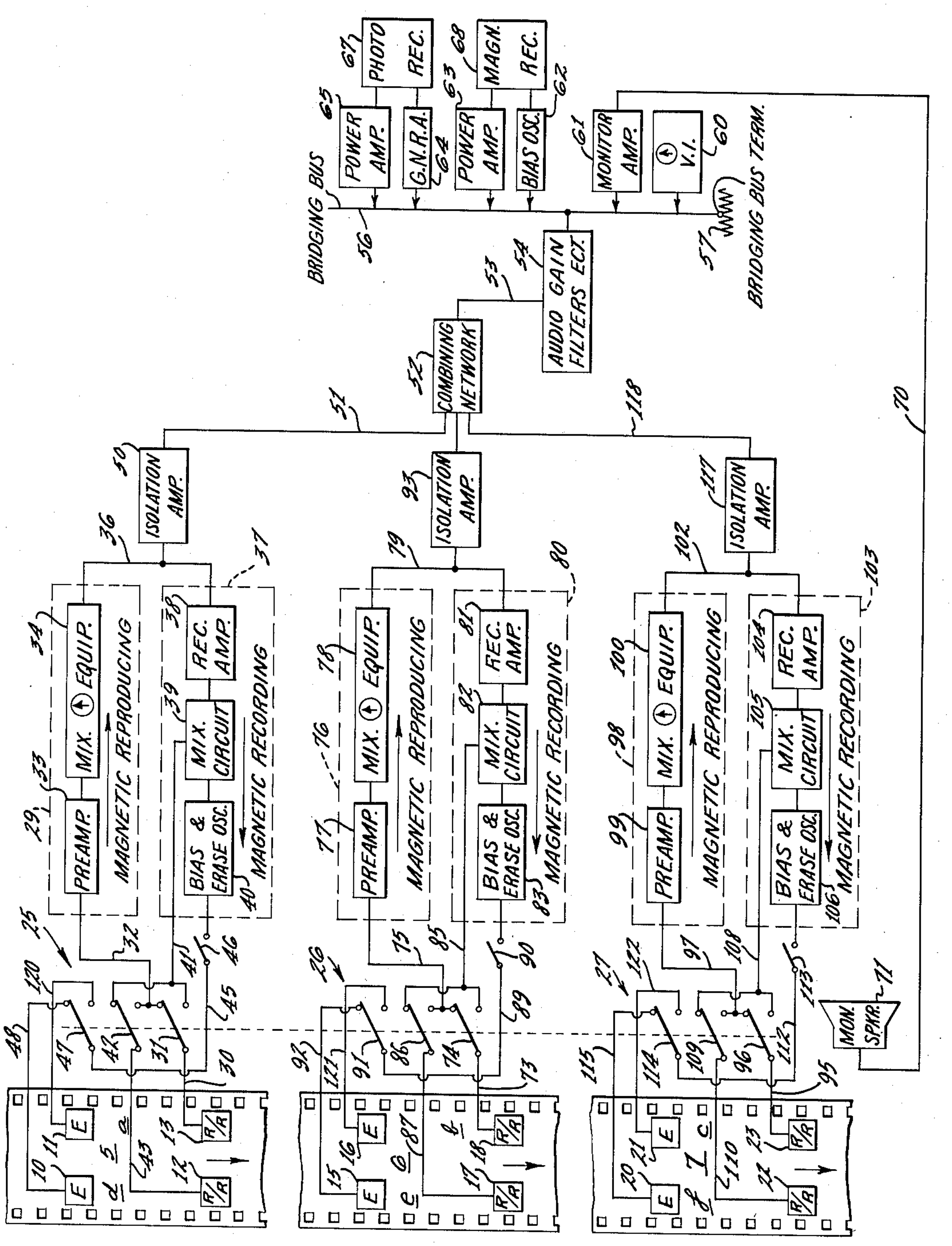
INVENTOR.
Hollis D. Bradbury
BY Orl R. Godsoe
ATTORNEY United States Patent Office 2,733,301

Patented Jan. 31, 1956

2,733,301

SOUND RERECORDING SYSTEM

Hollis D. Bradbury, Bronxville, N. Y., assignor to Radio Corporation of America, a corporation of Delaware Application October 14, 1952, Serial No. 314,709

9 Claims. (Cl. 179—100.2)

This invention relates to sound recording and reproducing systems, and particularly to a magnetic sound rerecording system.

In the production of sound motion pictures, it is now the general practice to record the concomitant sound for a picture being simultaneously photographed on a magnetic film separate from the picture film. Many sequences are so recorded, which are then joined together with sequences of the same type. For instance, the various dialogue sequences will be joined together and synchronized with the picture film either by having the same over-all length or over-all running time. Other sound records containing background effects, such as crowd noises, hoof beats, etc., are later combined with the dialogue as well as certain other forms of background effects, such as music.

The usual practice is to simultaneously run the various sound films, and, during their running, adjust the volume of level of the current representing each type of signal so as to obtain a desired balance between the signals before they are combined into a single composite sound record which is to accompany the picture. In the past, many rehearsals have had to be made to obtain the proper balance over a complete film roll before the final track is recorded. Even with the many rehearsals, it is difficult, in the final "take," to exactly duplicate the amplitude variations made during the satisfactory rehearsal, particularly when a large number of tracks are being combined and several mixers are used to control the volumes of the many signals.

The present invention is directed to a system whereby a signal with the variations made therein during a rehearsal is recorded so that, upon a second rehearsal or the final take, the exact change signal may be duplicated. This permits any other desired changes therein to be made to certain portions without affecting those portions having the proper amplitude variations. This can be accomplished with the magnetic type of sound recording and reproduction, whereby the same film may be used several times for different records. That is, by erasing the prior record just before the recording of a new record, a single film may be used to record a rehearsal which may be subsequently reproduced for obtaining the final composite sound record. In this manner, not only is the number of rehearsals required reduced, thus saving time, but a better composite record is obtained.

In Wolfe U. S. Patent No. 2,279,018, a record of the variations in a signal were recorded, the subsequent reproduction thereof varying the original signal when again reproduced. The present invention records the signal itself.

The principal object of the invention, therefore, is to facilitate the combination of a plurality of sound records into a composite record.

Another object of the invention is to provide an improved sound rerecording system.

A further object of the invention is to provide a magnetic film rerecording system which reduces the number of rehearsals required and provides an improved composite record either as a magnetic or photographic record.

A still further object of the invention is to provide an improved robot form of rerecording system.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single line figure is a diagrammatic view of a system embodying the invention.

Referring now to the drawing, three original sound records are shown being combined into a composite record, it being understood that the system is also applicable when combining two original records or more than three records, three records being shown for purposes of illustration. The drawing shows portions 5, 6, and 7 of three magnetic film rolls, which are adapted to have two magnetic tracks recorded thereon and reproduced therefrom. It may be assumed that the film 5 contains the original dialogue record along track *a*, that the original music track is at *b* of film 6, and that the background effects are recorded at *c* of film 7. The film 5 has two magnetic erase heads 10 and 11 associated therewith and two combination record-reproduce heads 12 and 13 associated therewith. By combination record-reproduce heads is meant that the head may be used either for recording or for reproducing. The film 6 has corresponding erase heads 15 and 16 and corresponding record-reproduce heads 17 and 18. For film 7, erase heads 20 and 21 and combination record and reproduce heads 22 and 23 are provided. The arrows on each film indicate the directions of travel of the respective films. These films are advanced in suitable magnetic film driving mechanisms, not shown.

Although the original sound records are indicated at *a*, *b*, and *c*, the original records may be on other magnetic and/or photographic films, the sound effects being in loops.

The heads above mentioned are shown connected to triple pole, double throw switches 25, 26, and 27. The switch 25 is shown connecting head 13 to a reproducing channel shown within the dotted lines 29 over conductor 30, swinger 31, and conductor 32 to a preamplifier 33. The preamplifier 33 feeds a mixer unit 34 which varies the volume of a track *a* being reproduced. The output of the mixer 34 is fed over a conductor 36 to a recording channel shown within the dotted lines 37 containing a recording amplifier 38, a mixing circuit 39, and a bias and erase oscillator unit 40. That is, the output of the unit 40 is fed to the mixing circuit in which the signal to be recorded is combined with the bias frequency current as is well known in the magnetic recording art. The output of the mixing circuit 39 is fed over conductor 41 to swinger 42, and over conductor 43 to the record-reproduce unit 12. Simultaneously, the bias oscillator frequency is fed over conductor 45 when the switch 46 is closed, to swinger 47, and then over conductor 48 to erase head 10.

The above described channel, therefore, reproduces track *a* in which the level of the signal is varied by unit 34, which is then rerecorded in the track *d* by record-reproduce unit 12. If the track *d* had a prior recorded signal thereon, it would be erased by erase head 10 before the new signal is recorded. The reproduced signal, in addition to being impressed on the recording amplifier 38, is also impressed on an isolation amplifier 50 connected over conductor 51 to a combining network 52, the output of which is connected over conductor 53 to an audio gain amplifier unit 54, which may contain any desired filters for varying the frequency characteristic of the composite signal. The output of the unit 54 is connected to a bridging bus 56 having a terminating resistor 57. To the bus 56, several units are connectable, such as a volume indicator 60, a monitor amplifier 61, a bias oscillator 62, a power amplifier 63, a ground noise reduction amplifier 64, and a power amplifier 65. The ground noise reduction amplifier 64 and the power amplifier 65 are connected to a photographic recorder 67 in any suitable manner well-known in the art, while the bias oscillator 62 and power amplifier 63 are connected to a magnetic recorder 68 in any suitable manner well-known in the art. The monitor amplifier 61 is connected over conductor 70 to a monitoring loudspeaker 71. Thus, the dialogue record of film 5 is reproduced, rerecorded in track *d* on film 5, is monitored at 71, and may be recorded into a photographic record and/or a magnetic record at 67 or 68, respectively. If the magnetic and photographic recorders 68 and 67, respectively, were not connected to the bus, these recordings would not be made.

Referring now to the music record film 6, the record-reproduce head 18 of track *b* is connected over conductor 73, swinger 74, and conductor 75, to a reproducing unit shown in the dotted lines 76, which contains a preamplifier 77 for a mixer unit 78 for controlling the volume of the music signal. The output of the unit 78 is fed over conductor 79 to the recording portion of the channel shown in the dotted line 80, which contains a recording amplifier 81, a mixing circuit 82, and a bias oscillator unit 83. The output of the mixer unit 82 is fed over conductor 85, swinger 86, and conductor 87 to head 17. Simultaneously, a bias current is fed over conductor 89, when switch 90 is closed, swinger 91, and conductor 92 to erase head 15. This music channel functions in the same manner as the dialogue channel, the music track *b* being rerecorded to track *e* of film 6, and, at the same time, being impressed on combining network 52 over isolation amplifier 93.

Referring now to the background effects channel from film 7, the output of the record-reproduce head 23 of track *c* is fed over conductor 95, swinger 96, conductor 97, to the reproducing portion of the channel shown within the dotted lines 98, which contains a preamplifier 99 and a mixer unit 100. The output of unit 100 is fed over conductor 102 to the recording portion of the channel shown within the dotted lines 103, containing recording amplifier 104, mixer circuit 105, and a bias and erasing oscillator 106. The output of the mixing unit 105 is fed over conductor 108, swinger 109, and conductor 110 to record unit 22. Simultaneously, the erasing current is fed over conductor 112, when switch 113 is closed, swinger 114, and conductor 115, to erase head 20. Thus, the background effects from track *c* are reproduced and rerecorded into track *f*, any former track being erased at 20. The reproduced signal is simultaneously impressed on isolation amplifier 117 connected over conductor 118 to the combining network 52.

From the connections above described, the dialogue track *a*, music track *b*, and background effects track *c* are simultaneously reproduced and rerecorded on their respective films in tracks *d*, *e*, and *f*, respectively. They are also combined at 52 and are monitored at 71, and may or may not be recorded as a composite photographic record at 67 or a composite magnetic record at 68. Assuming that this is the first rehearsal, the composite signal recorders may not be connected to the bus 56, but the new records are recorded at *d*, *e*, and *f*. During this rehearsal, many sections of the respective signals will be properly combined with respect to their original amplitudes and the story being depicted by the picture, but perhaps the amplitudes of all sections have not been correctly adjusted. Thus, a second rehearsal is made which requires simply throwing the three switches 25, 26, and 27 to their lower positions, as shown in the drawing. When this occurs, connections are then made for film 5 from the record-reproduce head 12 over conductor 43, swinger 42, and conductor 32 to reproducing section 29. This signal is now impressed on the recording unit 37, the mixing circuit unit 39 now being connected over conductor 41, swinger 31, and conductor 30 to the record head 13. Simultaneously, the erasing current is impressed over switch 46, conductor 45, swinger 47, and conductor 120 to erase head 11. Thus, during operation, the first rehearsal track *d* is now reproduced and rerecorded in the position of track *a*, the original track *a* being erased by the head 11 prior to the new recording.

The same condition obtains for the music film 6, the first rehearsal track *e* being rerecorded in the area of original track *b*, erase head 16 erasing the original track when connected by a swinger 91 and conductor 121 to the erasing current oscillator 83.

For the background film 7, the rehearsal track *f* will now be recorded in the position of original track area *c*, and the original track *c* will be erased by head 21 when connected over conductor 122 and swinger 114 to the erasing oscillator 106. As in the first rehearsal, the three signals are combined at 52 and monitored at 71, and may or may not be recorded as a composite record at 67 and 68. However, after the second rehearsal, if it appears that the relative amplitudes of the three signals are proper over the entire rolls of film being combined, the final composite may be made, either photographically at 67 or magnetically at 68, or both. However, if a third rehearsal is desired, the switches 25, 26, and 27 are thrown to their upper positions, as shown in the drawing, and the third rehearsal tracks are recorded at positions *d*, *e*, and *f*, as in the first rehearsal.

Although only a two-track recording and reproducing system is illustrated, it is to be understood that a three or more track recorder and reproducer may be employed, whereby the original tracks or the original or any rehearsal tracks may be saved for reference, if desired. Furthermore, any of the tracks, once rerecorded during a rehearsal, may be played back for rehearsal purposes or for rerecording purposes without making a new magnetic recording at the time of playback. Thus, two tracks may be preserved for checking, review, or rerecording. Also, such tracks as are considered satisfactory may be played back without alteration and simultaneously be combined with other tracks which are still being rehearsed and individually rerecorded. At such times, an over-all magnetic or photographic recording may or may not be made.

The system permits the operators, or sound mixers, as they are called, to obtain perfection in the combining of the independent sound tracks in quicker time than now required, when they have to adjust all three records over their entire lengths at each running. It also permits them to obtain a better final composite track, since there is no missing of cues in the final take and they can pay more attention to the frequency variations desired in the signals after the amplitude variations have been made.

Thus, the mixer has to do things right only once, and those portions which were not done right the first time can be concentrated upon and corrected subsequently.

I claim:

1. A magnetic rerecording system for a plurality of multi-track magnetic films movable along predetermined paths comprising a plurality of magnetic heads along said paths adapted to contact each of said films and to serve as recorders and reproducers, a corresponding plurality of magnetic heads along said paths also adapted to contact each of said films and to serve as erase heads, one of said erase heads being disposed on the same longitudinal portion of the film along one of said film paths as one of said first mentioned heads, a plurality of erasing oscillators each connectable to a different one of said erase heads, a plurality of multi-pole switches, each of said switches being associated with the heads at a different one of said paths, a plurality of amplifiers each connectable to a different one of said first mentioned heads when said first mentioned heads serve as reproducers, and a plurality of circuits between said heads, oscillators, amplifiers and switches, each of said switches in one position interconnecting said circuits to simultaneously interconnect an associated head serving as a reproducer for a track on one of said films to the input of its associated amplifier and an associated head serving as a recorder for a track on said one film to the output of said associated amplifier, and to interconnect an associated erase head to its associated erasing oscillator.

2. A magnetic rerecording system in accordance with claim 1 in which each of said switches, in another position thereof, interconnects its said associated recorder head to the input of its said associated amplifier to serve as a reproducer and its said associated reproducer head to the output of its said associated amplifier to serve as a record head, and also connects its said associated erase head in alignment with said last mentioned head to its said associated oscillator.

3. A magnetic rerecording system in accordance with claim 1, in which are provided a single recorder and circuit means for connecting the outputs of all of said amplifiers to said single recorder during the reproduction of any of said tracks.

4. A magnetic rerecording system in accordance with claim 1, in which means are connected to said amplifiers for individually varying the amplitude of each of the signals being reproduced during the reproduction thereof.

5. A plural magnetic track rerecording system employing a plurality of magnetic films movable along predetermined paths and each of which is adaptable to have one track recorded thereon during the reproduction of another track previously recorded thereon, said system comprising a plurality of combination record and reproduce heads along said paths adapted to contact said films transversely thereof, an amplifier for the signal being reproduced from any of said tracks from one film, a plurality of switches, and a plurality of interconnecting circuits between said heads and switches, said switches, in one position thereof, simultaneously connecting through said circuits one head on each said film to the input of the amplifier for said film and another head on said film to the output of said amplifier.

6. A plural magnetic track rerecording system in accordance with claim 5, in which said switches, in another position, connects through said circuits said head formerly connected to the input of said amplifier to the output thereof, and said head formerly connected to the output of said amplifier to the input thereof.

7. A rerecording system for a plurality of magnetic films movable along predetermined paths, said system comprising means for simultaneously reproducing a track from each film and rerecording said track thereon, said means including means for varying the amplitude of each of said rerecorded tracks from that of said first tracks, and means for recording all of said reproduced track as a single track.

8. A rerecording system in accordance with claim 7 in which means are provided for erasing any one of said tracks as a new track is recorded in the same track area.

9. A rerecording system in accordance with claim 7 in which said first mentioned means are combination record and reproduce heads for each film, a plurality of switches being provided between said heads for reversing the functions thereof.

References Cited in the file of this patent

UNITED STATES PATENTS 2,604,549 Begun ---------------- July 22, 1952